(12) United States Patent
Goto et al.

(10) Patent No.: US 10,843,681 B2
(45) Date of Patent: Nov. 24, 2020

(54) VEHICLE CONTROL APPARATUS

(71) Applicants: TOYOTA JIDOSHA KABUSHIKI KAISHA, Toyota (JP); AISIN AW CO., LTD., Anjo (JP)

(72) Inventors: Jun Goto, Nagoya (JP); Kenta Kumazaki, Anjo (JP); Kazuyuki Shiiba, Miyoshi (JP); Tooru Matsubara, Toyota (JP); Masato Yoshikawa, Toyota (JP); Kazuomi Okasaka, Anjo (JP); Atsushi Kayukawa, Anjo (JP); Daisuke Suyama, Anjo (JP); Mitsuru Maeda, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 210 days.

(21) Appl. No.: 16/119,158

(22) Filed: Aug. 31, 2018

(65) Prior Publication Data

US 2019/0061738 A1 Feb. 28, 2019

(30) Foreign Application Priority Data

Aug. 31, 2017 (JP) .................................. 2017-167686

(51) Int. Cl.
*B60W 20/30* (2016.01)
*F16H 61/02* (2006.01)
(Continued)

(52) U.S. Cl.
CPC ............... *B60W 20/30* (2013.01); *B60K 6/40* (2013.01); *B60K 6/547* (2013.01); *B60W 10/06* (2013.01);
(Continued)

(58) Field of Classification Search
CPC .... B60W 10/06; B60W 10/115; B60W 20/00; B60W 10/08; B60W 20/30; B60W 2710/0666; B60W 2540/10; B60W 10/026
See application file for complete search history.

(56) References Cited

U.S. PATENT DOCUMENTS 5,800,309 A * 9/1998 Takiguchi ............. F16H 61/061
5,908,370 A * 6/1999 Kubo .................... F16H 61/061
477/143
(Continued)

FOREIGN PATENT DOCUMENTS

JP 2004-1505449 A * 5/2004
JP 2004-293710 A 10/2004

*Primary Examiner* — Redhwan K Mawari
(74) *Attorney, Agent, or Firm* — Oliff PLC

(57) ABSTRACT

A vehicle control apparatus selects one of a power-on control and a power-off control for execution of a shift-down action in a transmission of a vehicle, and implements the selected power-on or power-off control. When a running speed of the vehicle is not lower than a predetermined value, the control apparatus selects one of the power-on control and the power-off control, based on a target input torque that is to be inputted to the transmission. When the vehicle running speed is lower than the predetermined value, the control apparatus selects one of the power-on control and the power-off control, based on an actual input torque that is actually inputted to the transmission.

14 Claims, 8 Drawing Sheets

(51) Int. Cl.
  *B60K 6/547* (2007.10)
  *B60K 6/40* (2007.10)
  *B60W 10/06* (2006.01)
  *B60W 10/08* (2006.01)

(52) U.S. Cl.
  CPC ......... *B60W 10/08* (2013.01); *F16H 61/0204* (2013.01); *B60W 2510/1025* (2013.01); *B60W 2520/10* (2013.01); *B60W 2540/10* (2013.01); *B60W 2710/0666* (2013.01); *B60W 2710/083* (2013.01); *B60W 2710/1005* (2013.01); *B60Y 2200/92* (2013.01)

(56) References Cited

U.S. PATENT DOCUMENTS

| | | | | |
|---|---|---|---|---|
| 6,068,576 | A * | 5/2000 | Tsutsui | F16H 61/061 477/102 |
| 9,604,529 | B2 * | 3/2017 | Choi | B60K 6/365 |
| 2004/0259682 | A1 * | 12/2004 | Tabata | B60W 10/06 477/102 |
| 2005/0107936 | A1 * | 5/2005 | Keyse | F16H 61/061 701/58 |
| 2007/0149351 | A1 * | 6/2007 | Inuta | F16H 61/0437 477/70 |
| 2007/0254772 | A1 * | 11/2007 | Satou | F02D 41/1498 477/107 |
| 2008/0009388 | A1 * | 1/2008 | Tabata | B60W 10/08 477/2 |
| 2008/0153664 | A1 * | 6/2008 | Tabata | B60K 6/547 477/37 |
| 2008/0234914 | A1 * | 9/2008 | Tabata | B60W 10/06 701/99 |
| 2009/0156359 | A1 * | 6/2009 | Tabata | F16H 61/0437 477/108 |
| 2009/0215586 | A1 * | 8/2009 | Kresse | B60K 6/547 477/110 |
| 2011/0239801 | A1 * | 10/2011 | Inagaki | F02D 29/06 |
| 2013/0109533 | A1 * | 5/2013 | Matsubara | F16H 61/061 477/80 |
| 2017/0080931 | A1 * | 3/2017 | D'Amato | B60W 30/16 |
| 2018/0229728 | A1 * | 8/2018 | Nickerson | B60W 10/06 |
| 2019/0061738 | A1 * | 2/2019 | Goto | B60K 6/40 |

* cited by examiner

| AT GEAR POSITION | C1 | C2 | B1 | B2 | F1 |
|---|---|---|---|---|---|
| 1st | ○ |  |  | ○ | ○ |
| 2nd | ○ |  | ○ |  |  |
| 3rd | ○ | ○ |  |  |  |
| 4th |  | ○ | ○ |  |  |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2017-167686 filed on Aug. 31, 2017, the disclosure of which is herein incorporated by reference in its entirety.

FIELD OF THE INVENTION

The present invention relates to a control apparatus for a vehicle including a drive power source and a transmission that constitutes a part of a power transmitting path between the drive power source and drive wheels of the vehicle.

BACKGROUND OF THE INVENTION

There is well known a vehicle that includes a drive power source and a transmission that constitutes a part of a power transmitting path between the drive power source and drive wheels. A vehicle including an engine and an automatic transmission, which is disclosed in JP-2004-293710A, is an example of this type of vehicle. This document discloses that a shift-up control or a shift-down control is implemented in accordance with one of shifting control rules corresponding to respective power-on and power-off of the engine, wherein a determination as to whether the control is to be implemented in accordance with the shifting control rule corresponding to the power-on or in accordance with the shifting control rule corresponding to the power off, is made based on a throttle opening degree, for thereby improving a shift feeling given to a vehicle operator.

SUMMARY OF THE INVENTION

By the way, in a control apparatus of the vehicle disclosed in JP-2004-293710A, where a shift-down action is executed with a running speed of the vehicle being in a low speed range, if the above-described determination is made based on the throttle opening degree, there is a risk that a shifting shock could be caused. Specifically, since an accuracy of detection made by each rotating speed sensor is low in the low speed range, if the shift-down control is implemented in accordance with the shifting control rule corresponding to the power-on, which is selected based on the throttle opening degree, an engine rotating speed or the like cannot be easily controlled to a target value in process of the shift-down action, so that there is a risk that the shifting shock could be caused.

The present invention was made in view of the background art described above. It is therefore an object of the present invention to provide a control apparatus for a vehicle that includes a drive power source and a transmission that constitutes a part of a power transmitting path between the drive power source and drive wheels of the vehicle, which is capable of reducing a shifting shock caused during a shift-down action of the transmission even in a low running-speed range.

The object indicated above is achieved according to the following modes of the present invention.

According to a first mode of the invention, there is provided a control apparatus for a vehicle that includes (i) a drive power source and (ii) a transmission that constitutes a part of a power transmitting path between the drive power source and drive wheels of the vehicle. The control apparatus includes: a shift control portion configured to cause a shifting action to be executed in the transmission, by engaging an engaging coupling device as one of a plurality of coupling devices of the transmission which is to be engaged during the shifting action, and releasing a releasing coupling device as another one of the plurality of coupling devices which is to be released during the shifting action; and a selecting/implementing control portion configured, for execution of a shift-down action as the shifting action, to select one of a power-on control and a power-off control, and to implement a selected one of the power-on control and the power-off control. When a running speed of the vehicle is not lower than a predetermined value, the selecting/implementing control portion selects one of the power-on control and the power-off control, based on a target input torque that is to be inputted to the transmission. When the running speed of the vehicle is lower than the predetermined value, the selecting/implementing control portion selects one of the power-on control and the power-off control, based on an actual input torque that is actually inputted to the transmission.

According to a second aspect of the invention, in the control apparatus according to the first mode of the invention, when the running speed of the vehicle is lower than the predetermined value and the actual input torque is lower than a threshold value, the selecting/implementing control portion selects the power-off control, and implements the power-off control in which, from initiation of the shift-down action, a torque capacity of the releasing coupling device is reduced to zero or substantially zero and the actual input torque is limited to an upper limit value. Further, when the running speed of the vehicle is lower than the predetermined value and the actual input torque is not lower than the threshold value, the selecting/implementing control portion selects the power-on control, and implements the power-on control in which, for example, the actual input torque is controlled based on the target input torque without the actual input torque being limited to the upper limit value that is changed depending on an operation degree of an acceleration operation member of the vehicle and/or the running speed of the vehicle. Still further, when the miming speed of the vehicle is not lower than the predetermined value and the target input torque is lower than the threshold value, for example, the selecting/implementing control portion selects the power-off control, and implements the power-off control. Moreover, when the running speed of the vehicle is not lower than the predetermined value and the target input torque is not lower than the threshold value, for example, the selecting/implementing control portion selects the power-on control, and implements the power-on control.

According to a third aspect of the invention, in the control apparatus according to the second mode of the invention, the upper limit value of the actual input torque is changed depending on an operation degree of an acceleration operation member of the vehicle.

According to a fourth aspect of the invention, in the control apparatus according to the second or third aspect of the invention, the upper limit value of the actual input torque is changed depending on the running speed of the vehicle.

According to a fifth aspect of the invention, in the control apparatus according to any one of the first through fourth aspects of the invention, the drive power source of the vehicle includes: an engine; a differential mechanism having a first rotary element to which the engine is connected in a power transmittable manner, a second rotary element to which a first motor/generator is connected in a power transmittable manner, and a third rotary element to which an input shaft of the transmission is connected; and a second motor/generator connected to the third rotary element of the third rotary element in a power transmittable manner.

When the running speed of the vehicle is low, there is a risk that a shifting shock could be caused due to control accuracy reduction resulting from reduction of accuracy of detection made by a rotating speed sensor or the like. In the control apparatus according to the first mode of the invention, when the vehicle running speed is for one of the power-on control and the power-off control is selected based on the actual input torque rather than the target input torque, and the selected one of the power-on control and the power-off control is implemented. With the selection being made based on the actual input torque, a frequency of implementation of the power-off control in which a higher priority is given to reduction of the shifting shock is increased whereby the shifting shock is reduced. On the other hand, when the vehicle running speed is high, one of the power-on control and the power-off control is selected based on the target input torque rather than the actual input torque, whereby a high degree of responsiveness can be assured.

In the control apparatus according to the second mode of the invention, when the vehicle running speed is lower than the predetermined value and the actual input torque is lower than the threshold vale, the power-off control is selected to be implemented. By implementation of the power-off control, the torque capacity of the releasing coupling device is reduced to zero or to a vicinity of zero and the actual input torque is limited to the upper limit value, so that a rotating speed of an input shaft of the transmission can be synchronized with a target value after completion of the shift-down action while the rotating speed of the input shaft is restrained from being fluctuated and abruptly increased. Thus, it is possible to restrain the shifting shock caused upon the rotational synchronization.

In the control apparatus according to the third mode of the invention, the upper limit value of the actual input torque is changed depending on an operation degree of an acceleration operation member of the vehicle, so that the shift-down action can be executed appropriately depending on an acceleration required by an operator of the vehicle. Since the operation degree of the acceleration operation member is increased with increase of the acceleration required by the vehicle operator, for example, the responsiveness can be increased owing to the arrangement in which the upper limit value is changed to be increased with increase of the operation degree of the acceleration operation member.

In the control apparatus according to the fourth mode of the invention, the upper limit value of the actual input torque is changed depending on the running speed of the vehicle, so that the shift-down action can be executed appropriately depending on the vehicle running speed. Since the rotating speed of the input shaft of the transmission is changed, during the shift-down action, by an amount that is increased with increase of the vehicle running speed, for example, the responsiveness can be restrained from being reduced, owing to the arrangement in which the upper limit is changed to be increased with increase of the vehicle running speed.

In the control apparatus according to the fifth mode of the invention, the actual input torque inputted to the transmission can be calculated, as needed, on the basis of output states of the respective engine, first motor/generator and second motor/generator.

DETAILED DESCRIPTION OF PREFERRED EMBODIMENTS

In the preferred embodiments, a target input torque to be inputted to the transmission corresponds to a torque required by a vehicle operator, and is calculated based on operation degree of the acceleration operation member and a running speed of the vehicle. Further, an actual input torque inputted to the transmission corresponds to a torque actually inputted to the transmission, and is calculated, as needed, based on a torque of the engine and a torque of the motor/generator.

In the following description of the embodiments of the invention, a rotating speed ω of a rotational state of each of rotating devices (e.g., an engine, a motor generator, a first motor/generator, a second motor/generator, rotary elements of a differential mechanism, an intermediate power-transmitting member, rotary elements of an automatic transmission) corresponds to an angular speed of the rotating device. The angular acceleration dω/dt of each of the rotating devices is a time rate of change of the rotating speed ω, i.e., a time derivative of the rotating speed ω, and is a speed of change of the rotating speed ω. In a mathematical formula, the angular acceleration dω/dt is represented by "ω'" ("ω" with dot) where appropriate.

Hereinafter, an embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
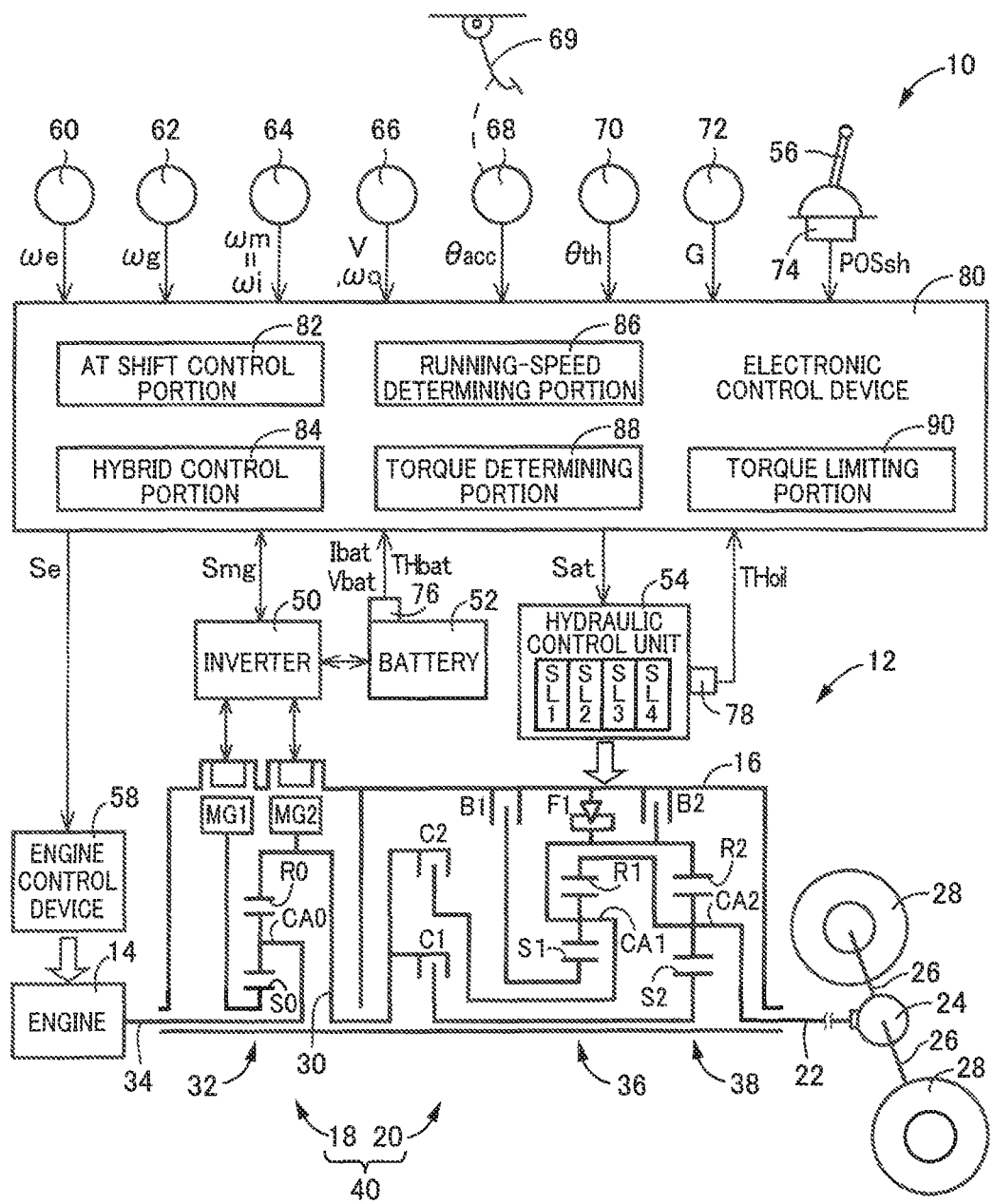
FIG. 1 is a schematic view showing an arrangement of a drive system of a vehicle to be controlled by a control apparatus according to the present invention, and major control functions and control portions of the control apparatus.

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 serving as a drive power source, an electrically-controlled continuously-variable transmission portion 18 (hereinafter referred to as "continuously-variable transmission portion 18") connected directly indirectly via a damper (not shown) or any other device to the engine 14, and a mechanically-operated step-variable transmission portion 20 thereinafter referred to as "step-variable transmission portion 20") connected to an output rotary member of the continuously-variable transmission portion 18. The continuously-variable transmission portion 18 and the step-variable transmission portion 20 are disposed in series with each other within a transmission casing 16 (hereinafter referred to as "casing 16") serving as a non-rotatable member fixed to a body of the vehicle 10, such that the transmission portions 18 and 20 are disposed coaxially with each other on a common axis. The vehicular drive system 12 is further provided with a differential gear device 24 connected to an output rotary member of the step-variable transmission portion 20 in the form of an output shaft 22, and a pair of axles 26 connected to the differential gear device 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear device 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously-variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14, is controlled by an electronic control device 80 (described below) which controls an opening angle θth of a throttle valve or an intake air quantity, an amount of injection of a fuel and an ignition timing. In the present embodiment, the engine 14 is connected to the continuously-variable transmission portion 18, without a fluid-operated type power transmitting device such as a torque converter or a fluid coupling being disposed between the engine 14 and the transmission portion 18.

The continuously-variable transmission portion 18 is provided with: a first motor/generator (first rotating machine) MG1; a differential mechanism 32 serving as a power distributing device to mechanically distribute the drive force of the engine 14 to the first motor/generator MG1, and to an intermediate power-transmitting member 30 that is an output rotary member of the continuously-variable transmission portion 18; and a second motor/generator (second rotating machine) MG2 connected to the intermediate power-transmitting member 30 in a power transmittable manner. The continuously-variable transmission portion 18 is an electrically-controlled continuously-variable transmission wherein a differential state of the differential mechanism 32 is controllable by controlling an operational state of the first motor/generator MG1. The first motor/generator MG1 serves as a differential motor/generator (differential electric motor) while the second motor/generator MG2 is an electric motor that serves as a drive power source, namely, a vehicle driving motor/generator (vehicle driving electric motor). The vehicle 10 is a hybrid vehicle provided with the drive power source in the form of the engine 14 and the second motor/generator MG2. In the present embodiment, the engine 14, the first motor/generator MG1, the second motor/generator MG2 and the differential mechanism 32 cooperate to constitute the drive power source that is recited in the appended claims.

Each of the first motor/generator MG1 and the second motor/generator MG2 is an electrically-operated rotating device having a function of an electric motor and a function of an electric generator. The first motor/generator MG1 and the second motor/generator MG2 are connected to an electric-power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided in the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is connected to the engine 14 through a connecting shaft 34 in a power transmittable manner, and the sun gear S0 is connected to the first motor/generator MG1 in a power transmittable manner, while the ring gear R0 is connected to the second motor/generator MG2 in a power transmittable manner. In the differential mechanism 32, the carrier CA0 serves as an input rotary element, and the sun gear S0 serves as a reaction rotary element, while the ring gear R0 serves as an output rotary element.

The step-variable transmission portion 20 is a mechanically-operated step variable transmission which constitutes a part of a power transmitting path between the intermediate power-transmitting member 30 and the drive wheels 28. The intermediate power-transmitting member 30 also serves as an input rotary member of the step-variable transmission portion 20. The step-variable transmission portion 20 is considered also to be a mechanically-operated step-variable transmission which constitute a part of a power transmitting path between the drive power source and the drive wheels 28, since the second motor/generator MG2 is connected to the intermediate power transmitting member 30 such that the intermediate power-transmitting member 30 is rotated together with the second motor/generator MG2, or since the engine 14 is connected to an input rotary member of the continuously-variable transmission portion 18. The step-variable transmission portion 20 is a known automatic transmission of a planetary gear type which is provided with a plurality of planetary gear sets in the form of a first planetary gear set 36 and a second planetary gear set 38, and a plurality of coupling devices including a clutch C1, a clutch C2, a brake B1 and a brake B2. Hereinafter, the clutch C1, clutch C2, brake B1 and brake B2 will be referred to as "coupling devices CB" unless otherwise specified.

Each of the coupling devices CB is a hydraulically operated frictional coupling device in the form of a multiple-disc type or a single-disc type clutch or brake that is to be pressed by a hydraulic actuator, or a band brake that is to be tightened by a hydraulic actuator. The coupling devices CB are selectively placed in engaged, slipped or released states with their torque capacities (engaging torque values or transmitted torque values) Tcb being changed according to engaging hydraulic pressures PRcb applied thereto, which are regulated by respective solenoid-operated valves SL1-SL4 incorporated within a hydraulic control unit 54 provided in the vehicle 10. In order for each coupling device CB to be able to transmit a torque (for example, an AT input torque Ti which is an input torque of the step-variable transmission portion 20) between the intermediate power-transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (transmitted torque) to be transmitted through an engaging action of the coupling device CB. However, it is noted that an increase of the engaging torque Tcb enough to obtain the transmitted torque does not cause an increase of the transmitted torque. That is, the engaging torque Tcb is equivalent to a maximum value of the torque that can be transmitted through the coupling device CB, and the transmitted torque is equivalent to the torque that is actually transmitted through the coupling device CB. Therefore, the engaging torque Tcb and the transmitted torque are equal to each other in the process of the engaging action of the coupling device CB with a speed difference between its input and output elements. In the present embodiment, the transmitted torque in the process of a shifting action of the step-variable transmission portion 20 with a speed difference of the input and output elements (for example, the transmitted torque during an inertia phase of the shifting action) is represented by the engaging torque Tcb (namely, transmitted torque Tcb). It is noted that the engaging torque (transmitted torque) Tcb and the engaging hydraulic pressure PRcb are substantially proportional to each other, except at a stage the engaging hydraulic pressure PRcb is raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power-transmitting member 30, casing 16 or output shaft 22, either directly or indirectly (selectively through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different gear ratios (speed ratios) γat (=AT input rotating speed ωi/AT output rotating speed ωo). Namely, the step-variable transmission portion 20 is shifted up and down from one gear position to another by placing selected ones of the coupling devices CB in the engaged state. The AT input rotating speed ωi is a rotating speed (angular speed) of the input rotary member of the step-variable transmission portion 20, that is, a rotating speed of the intermediate power-transmitting member 30, which is equal to an MG2 rotating speed ωm that is an rotating speed of the second motor/generator MG2. Thus, the AT input rotating speed ωi can be represented by the MG2 rotating speed ωm. The AT output rotating speed ωo is a rotating speed of the output shaft 22 of the step-variable transmission portion 20, which is considered to be an output speed of a transmission device 40 which consists of the continuously-variable transmission portion 18 and the step-variable transmission portion 20.

Figures 2, 3:
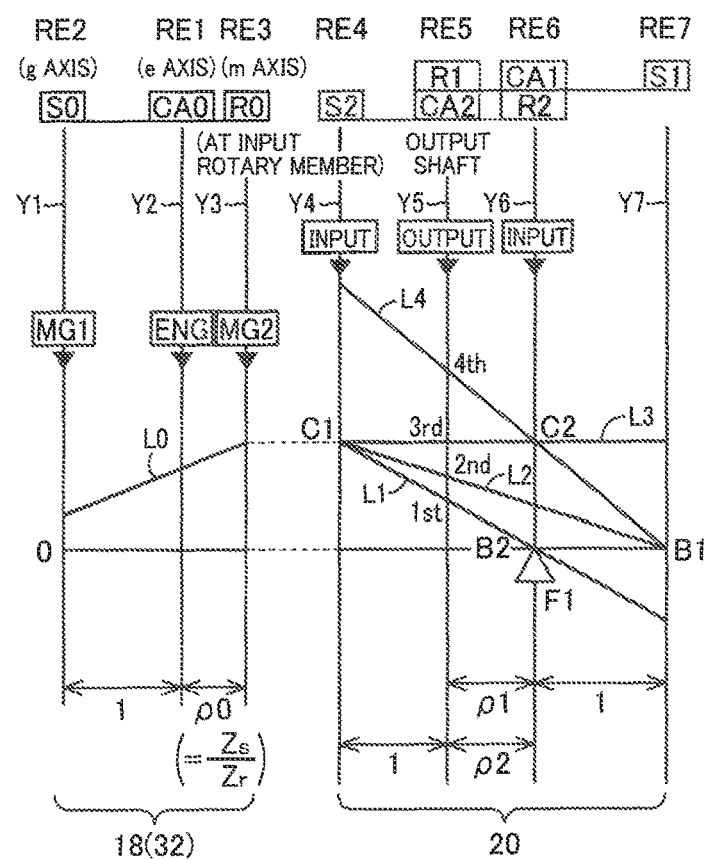
FIG. 2 is a table indicating a relationship between gear positions of a mechanically-operated step-variable transmission shown in FIG. 1 and combinations of coupling devices placed in engaged states to establish the respective gear positions.
FIG. 3 is a collinear chart indicating a relationship among rotating speeds of rotary elements of an electrically-controlled continuously-variable transmission and the mechanically-operated step-variable transmission.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward AT gear positions are respectively represented by "1st", "2nd", "3rd" and "4th". The first speed AT gear position "1st" is the lowest-speed gear position having a highest gear ratio γat, while the fourth speed AT gear position "4th" is the highest-speed gear position having a lowest gear ratio γat. The gear ratio γat decreases in the direction from the first speed AT gear position (lowest-speed gear position) "1st" toward the fourth speed AT gear position (highest-speed gear position) "4th". In the table, "O" indicates the engaged state of the coupling devices CB, and the blank indicates the released state of the coupling devices CB. The above-described one-way clutch F1 is disposed in parallel to the brake B2 that is placed in the engaged state to establish the first speed AT gear position "1st", so that the brake B2 is not required to be placed in the engaged state upon starting or acceleration of the vehicle 10. The shift down action of the step-variable transmission portion 20 in coasting run of the vehicle 10 is a kind of a "power-off shift-down action" that is required as a result of reduction of a vehicle-speed-related value (vehicle running speed V, for example) due to reduction of a required drive force (represented by, for example, an operation degree θacc of an accelerator pedal 69 that is operated by an operator of the vehicle 10) or during decelerating run of the vehicle 10 in a released position of the accelerator pedal 69 (with the operation degree θacc of the accelerator pedal 69 being zero or substantially zero), and is a shift-down action that is required during decelerating run of the vehicle 10 in the released position of the accelerator pedal 69. It is noted that the step-variable transmission portion 20 is placed in a neutral position, i.e., in a power transmission cutoff state when all of the coupling device's CB are placed in the released states.

The step-variable transmission portion 20 is shifted up or down to establish a newly selected one of the four AT gear positions, according to the operation degree θacc of the accelerator pedal 69 and the vehicle running speed V, with a releasing action of one of the coupling devices CB and an engaging action of another one of the coupling devices CB, which are controlled by the electronic control device 80, more specifically by an AT shift control portion 82 (described below) configured to control shifting actions of the step-variable transmission portion 20. The above-indicated one coupling device CB (i.e., releasing coupling device) was placed in the engaged state before the step-variable transmission portion 20 is shifted to establish the newly selected AT gear position, while the above-indicated another coupling device CB (i.e., engaging coupling device) is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, releasing and engaging, actions of the selected two coupling devices CB. For instance, the step-variable transmission portion 20 is shifted down from the second speed AT gear position "2nd" to the first speed AT gear position "1st", with the release of the brake B1 (as the releasing coupling device) and the engagement of the brake B2 (as the engaging coupling device), as indicated in the table of FIG. 2. In this instance, the hydraulic pressures applied to the brakes B1 and B2 are transiently controlled to bring these brakes B1 and B2 into the released and engaged states, respectively.

The collinear chart of FIG. 3 indicates a relationship among rotating speeds of the rotary elements of the continuously-variable transmission portion 18 and the step-variable transmission portion 20. In this collinear chart, three vertical lines Y1, Y2 and Y3 corresponding to the respective three rotary elements of the differential mechanism 32 of the continuously-variable transmission portion 18 respectively represent a "g AXIS" representing the rotating speed of the second rotary element RE2 in the form of the sun gear S0, an "e AXIS" representing the rotating speed of the first rotary element RE1 in the form of the carrier CA0, and an "m AXIS" representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio $\rho 0$ of the differential mechanism 32, while the distances between the adjacent ones of the vertical lines Y4-Y7 are determined by gear ratios $\rho 1$ and $\rho 2$ of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio $\rho$ of the planetary gear set (=number of teeth Zs of the sun gear/number of teeth Zr of the ring gear).

Referring to the collinear chart of FIG. 3, the differential mechanism 32 of the continuously-variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power-transmitting member 30. Thus, a rotary motion of the engine 14 is transmitted to the step-variable transmission portion 20 through the intermediate power-transmitting member 30. In a part of the collinear chart corresponding to the continuously-variable transmission portion 18, a straight line L0 intersecting the vertical line Y2 represents a relationship between the rotating speeds of the sun gear S0 and the ring gear R0.

The step-variable transmission portion 20 is arranged such that the fourth rotary element RE4 is selectively connected to the intermediate power-transmitting member 30 through the clutch C1, the fifth rotary element RE5 is connected to the output shaft 22, the sixth rotary element RE6 is selectively connected to the intermediate power-transmitting member 30 through the clutch C2 and is selectively connected to the casing 16 through the brake B2 or the one-way clutch F1, and the seventh rotary element RE7 is selectively connected to the casing 16 through the brake B1. In a part of the collinear chart corresponding to the step-variable transmission portion 20, straight lines L1, L2, and L4 intersecting the vertical line Y5 represent the rotating speeds of the output shaft 22 in the respective first, second, third, fourth and reverse speed AT gear positions "1st" "2nd", "3rd" and "4th" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque that is a negative torque generated by the first motor/generator MG1 operated in the positive direction is applied to the sun gear S0, a directly transmitted engine torque Td $(=Te/(1+\rho)=-(1/\rho)*Tg)$ that is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to required vehicle drive force. At this time, the first motor/generator MG1 serves as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is stopped (held at rest), the carrier CA0 is held stationary while the MG2 torque Tm which is a positive torque is applied to the ring gear R0 and rotating the ring gear R0 in the positive direction. The state of the differential mechanism 32 in this motor drive mode is not shown in the collinear chart of FIG. 3. At this time, the first motor/generator MG1 connected to the sun gear S0 is placed in a non-load state and freely rotatable in the negative direction. Namely, in the motor drive mode, the engine 14 is held in its non-operated state, so that an rotating speed ωe of the engine 14 (engine rotating speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions. Further, during driving of the vehicle 10 in the rearward direction in this motor drive mode, the MG2 torque Tm which is a negative torque generated by the second motor/generator MG2 rotated in the negative direction is applied to the ring gear R0, and is transmitted to the drive wheels 28 as a drive torque to drive the vehicle 10 in the rearward direction, through the step-variable transmission portion 20 placed in the first speed AT gear position.

In the vehicular drive system 12, the continuously-variable transmission portion 18 serves as an electrically-controlled shifting mechanism (electrically-controlled differential mechanism) provided with the differential mechanism 32 the differential state of which is controlled by controlling the operational state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power-transmitting member 30 is connected (in other words, to which the second motor/generator MG2 is operatively connected). Namely, the continuously-variable transmission portion 18 has the differential mechanism 32 to which the engine 14 is operatively connected in a power transmittable manner, and the first motor/generator MG1 to which the differential mechanism 32 is operatively connected in a power transmittable manner, and the operational state of which is controlled to control the differential state of the differential mechanism 32. The continuously-variable transmission portion 18 is operated as an electrically-controlled continuously-variable transmission a gear ratio $\gamma 0$ ($=\omega e/\omega m$) of which is variable. The gear ratio is a ratio of rotating speed of the connecting shaft 34 (namely, engine rotating speed ωe) to the rotating speed of the intermediate power-transmitting member 30 (namely, MG2 rotating speed ωm).

In the hybrid drive mode, for instance, the rotating speed of the sun gear S0 is increased or reduced by controlling the rotating speed of the first motor/generator MG1 while the rotating speed of the ring gear R0 is determined by the rotating speed of the drive wheels 28 with the step-variable transmission portion 20 placed in one of the AT gear positions, so that the rotating speed of the carrier CA0 (namely, engine rotating speed ωe) is accordingly increased or reduced. In running with operation of the engine 14, therefore, the engine 14 can be operated at an efficient operating point. That is, the step-variable transmission portion 20 to be placed in a selected one of the AT gear positions and the continuously-variable transmission portion 18 serving as a continuously-variable transmission cooperate to provide the transmission device 40 in which the continuously-variable transmission portion 18 (differential mechanism 32) and the step-variable transmission portion 20 are disposed in series with each other and which serves as a continuously-variable transmission as a whole.

Alternatively, the continuously-variable transmission portion 18 can be shifted like a step-variable transmission. Accordingly, the transmission device 40 constituted by the step-variable transmission portion 20 to be placed in one of the AT gear positions and the continuously-variable transmission portion 18 which can be shifted like the step-variable transmission can be shifted like a step-variable transmission as a whole. That is, the step-variable transmission portion 20 and the continuously-variable transmission portion 18 can be controlled to selectively establish a plurality of speed positions (hereinafter referred to as "overall speed positions" although it may be referred also to as "conceptual speed positions") having respective different values of a gear ratio $\gamma t$ ($=\omega e/\omega o$) which is a ratio of the engine rotating speed ωe to the output speed ωo. The gear ratio $\gamma t$ is an overall gear ratio of the transmission device 40 consisting of the continuously-variable transmission portion 18 and the step-variable transmission portion 20 which are disposed in series with each other. The overall gear ratio $\gamma t$ is equal to a product of the gear ratio $\gamma 0$ of the continuously-variable transmission portion 18 and the gear ratio $\gamma at$ of the step-variable transmission portion 20, namely, $\gamma t = \gamma 0 \gamma at$.

Figures 4, 5:
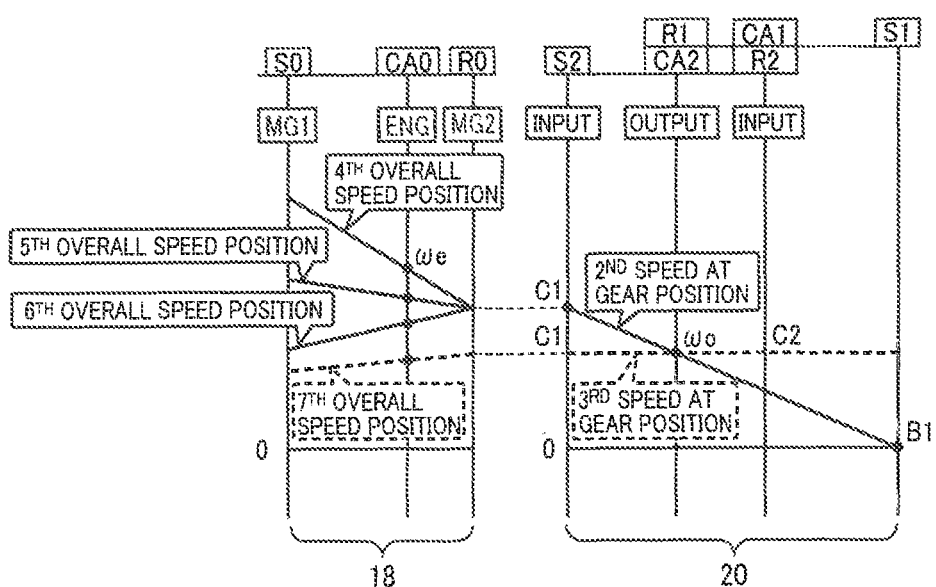
FIG. 4 is a table indicating an example of a plurality of overall speed positions of a transmission device in relation to the gear positions of the step-variable transmission.
FIG. 5 is a view indicating some examples of the gear positions of the step-variable transmission and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different gear ratio values $\gamma 0$ of the continuously-variable transmission portion 18. FIG. 4 is the table indicating an example of the overall speed positions of the transmission device 40, wherein the first through third overall speed positions are established for the first speed AT gear position, the fourth through sixth overall speed positions are established for the second speed AT gear position, seventh through ninth overall speed positions are established for the third speed AT gear position, and the tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously-variable transmission portion 18 is controlled to control the engine rotating speed ωe with respect to the output speed ωo for establishing the predetermined overall gear ratio values $\gamma t$, to thereby establish the different overall speed position or positions for each of the AT gear positions. A broken line indicates the seventh overall speed position established when the step-variable transmission portion 20 is placed in the third speed AT gear position. In the transmission device 40, the continuously-variable transmission portion 18 is controlled according to the selected one of the AT gear positions, for shifting the transmission device 40 from one of the overall speed positions to another.

Referring back to FIG. 1, the vehicle 10 is provided with the control apparatus in the form of the electronic control device 80 configured to control various devices of the vehicle 10 such as the engine 14, continuously-variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals from various sensors provided on the vehicle 10, such as: an output signal of an engine speed sensor 60 indicative of the engine rotating speed $\omega e$; an output signal of an MG1 speed sensor 62 indicative of the MG1 speed $\omega g$ which is the rotating speed of the first motor/generator MG1; an output signal of an MG2 speed sensor 64 indicative of the MG2 speed $\omega m$ that is the AT input rotating speed $\omega i$; an output signal of an output speed sensor 66 indicative of the output speed $\omega o$ corresponding to the vehicle running speed V; an output signal of an accelerator-pedal operation degree sensor 68 indicative of the operation degree $\theta acc$ of a vehicle-acceleration operation member in the form of the accelerator pedal 69, which operation degree $\theta acc$ represents a degree of acceleration of the vehicle 10 required by the vehicle operator; an output signal of a throttle valve opening angle sensor 70 indicative of an angle $\theta th$ of opening of an electronic throttle valve; an output signal of an acceleration sensor 72 indicative of a longitudinal acceleration G of the vehicle 10; an output signal of a shift position sensor 74 indicative of an operating position. POSsh of a manually operated shifting member in the form of a shift lever 56 provided on the vehicle 10; an output signal of a battery sensor 76 indicative of a temperature Thbat and a charging/discharging electric current Ibat and a voltage Vbat of the battery 52; and an output signal of a fluid temperature sensor 78 indicative of a temperature THoil of working fluid (oil) supplied to the hydraulic actuators of the coupling devices CB.

The electronic control device 80 generates various output signals to the various devices provided in the vehicle 10, such as: an engine control command signal Se to be applied to an engine control device 58 provided to control a throttle actuator, an fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the operational states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current or a drive voltage corresponding to the hydraulic pressure command value, so that the outputted drive current or voltage is supplied to the hydraulic control unit 54.

The electronic control device 80 is configured to calculate a charging state (stored electric power amount) SOC of the battery 52 on the basis of the charging/discharging electric current that and the voltage Vbat of the battery 52. The electronic control device 80 is further configured to calculate, based on, for example, the temperature THbat and the charging state SOC of the battery 52, a maximum charging amount Win of electric power that can be charged to the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of an AT shift control portion 82, and a hybrid control means or portion in the form of a hybrid control portion 84, for performing various controls in the vehicle 10.

The AT shift control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT shift control portion 82 causes a shifting action to be executed in the step-variable transmission portion 20, by engaging the engaging coupling device that is to be engaged during the shifting action, and releasing the releasing coupling device that is to be released during the shifting action. The AT gear position shifting map indicated above is a predetermined relationship between two variables in the form of the output speed $\omega o$ (equivalent to the vehicle running speed V) and the accelerator-pedal operation degree $\theta acc$ (equivalent to a required drive torque Tdem and the throttle valve opening angle $\theta th$), which relationship is used to determine a shifting action of the step-variable transmission portion 20 and is represented by shift-up and shift-down shifting lines in a two-dimensional coordinate system in which the output speed $\omega o$ and the accelerator-pedal operation degree $\theta acc$ are taken along respective two axes.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator-pedal operation degree θacc and the vehicle running speed V, and according to a predetermined relationship in the form of a drive force map, for instance. In other words, the hybrid control portion 84 calculates the required drive torque Tdem at the present vehicle running speed V.

The hybrid control portion 84 generates the engine control command signal Se to control the engine 14, and the motor/generator control command signals Smg to control the first motor/generator MG1 and the second motor/generator MG2, for establishing the required vehicle drive power Pdem. For example, the engine control command signal Se represents a command value of an engine power Pe which is a power of the engine 14 outputting the torque Te at its present rotating speed ωe. For example, the motor/generator control command signals Smg represent a command value of an electric power amount Wg to be generated by the first motor/generator MG1 to generate the reaction torque acting against the engine torque Te, namely, the MG1 torque at the present MG1 speed ωg, and an electric power amount Wm to be consumed by the second motor/generator MG2 to generate the MG2 torque Tm at the present MG2 rotating speed ωm.

When the transmission device 40 as a whole is operated as the continuously-variable transmission with the continuously-variable transmission portion 18 being operated as the continuously-variable transmission, for instance, the hybrid control portion 84 controls the engine 14 and the electric power amount Wg to be generated by the first motor/generator MG1, so as to establish the engine rotating speed ωe and the engine torque Te for obtaining the engine power Pe to establish the required vehicle drive power Pdem, while taking account of a highest fuel economy point of the engine 14, so that the gear ratio γ0 of the continuously-variable transmission portion 18 is controlled so as to be continuously varied. As a result, the gear ratio γt of the transmission device 40 is controlled while the continuously-variable transmission portion 18 is operated as the continuously-variable transmission.

When the transmission device 40 as a whole is operated as the step-variable transmission with the continuously-variable transmission portion 18 being operated as the step-variable transmission, for instance, the hybrid control portion 84 determines a shifting action of the transmission device 40 according to an overall speed-position shifting map, for example, and performs a shifting control of the continuously-variable transmission portion 18 to establish a selected one of the plurality of overall speed positions, in cooperation with the AT shift control portion 82 to shift the step-variable transmission portion 20 selectively to the AT gear positions. The plurality of overall speed positions can be established by controlling the first motor/generator MG1 to control the engine rotating speed ωe according to the output speed ωo so as to maintain the respective gear ratio values γt. It is noted that the gear ratio γt in each of the overall speed positions does not necessarily have to be constant over all ranges of the output speed ωo, but may be changed in a certain range or ranges of the output speed ωo or may be given a limitation or limitations, for example, depending on upper and lower limits of rotating speeds of respective rotatable elements.

Figure 6:
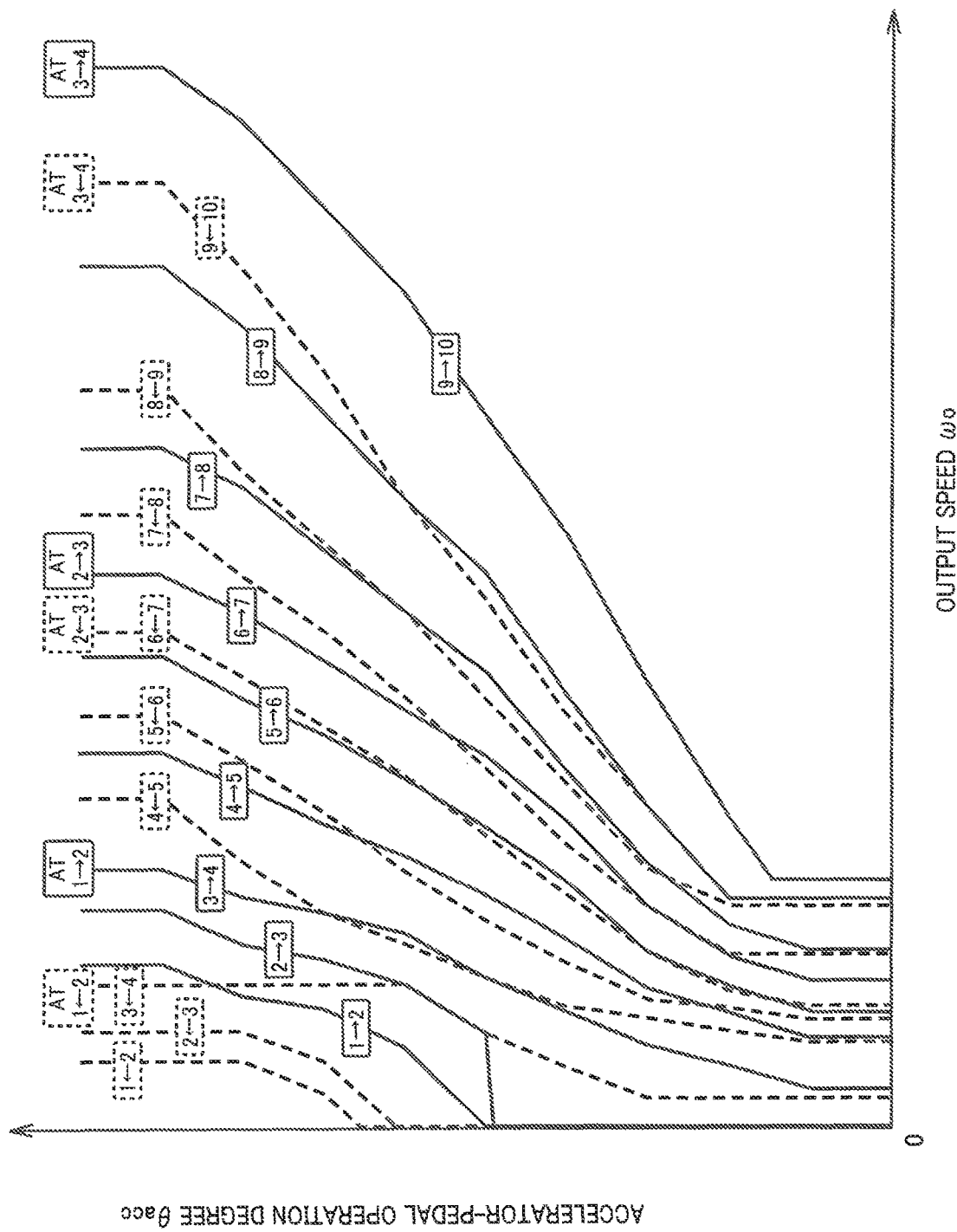
FIG. 6 is a view illustrating an example of an overall speed-position shifting map used to shift up and down the transmission device from each of the overall speed positions to the adjacent position or positions.

Like the AT gear position shifting map, the above-indicated overall speed-position shifting map is a relationship between the output speed ωo and the accelerator-pedal operation degree θacc as parameters. FIG. 6 is the view illustrating an example of the overall speed-position shifting map. In FIG. 6, solid lines indicate shift-up boundary lines while broken lines indicate shift-down boundary lines. The transmission device 40 consisting of the continuously-variable transmission portion 18 and the step-variable transmission portion 20 which are disposed in series with each other is shifted from one of the overall speed positions to another according to the overall speed-position shifting map, as if the transmission device 40 was shifted like a step-variable transmission as a whole. This overall shifting control to control the shifting actions of the transmission device 40 as the step-variable transmission as a whole may be implemented preferentially to the continuously-variable shifting control of the transmission device 40 as the continuously-variable transmission as a whole, when a sporty drive mode or any other high-drivability drive mode is selected by the vehicle operator, or when the required drive torque Tdem is comparatively high, but may be principally implemented except where the overall shifting control is restricted or inhibited.

The overall shifting control by the hybrid control portion 84 and the shifting control of the step-variable transmission portion 20 by the AT shift control portion 82 are implemented in cooperation with each other. In this embodiment, the first through tenth overall speed positions are established for the first through fourth speed AT gear positions. When the transmission device 40 is shifted between the third overall speed position and the fourth overall speed position, for example, the step-variable transmission portion 20 is shifted between the first speed AT gear position and the second speed AT gear position. When the transmission device 40 is shifted between the sixth overall speed position and the seventh overall speed position, the step-variable transmission portion 20 is shifted between the second speed AT gear position and the third speed AT gear position. When the transmission device 40 is shifted between the ninth overall speed position and the tenth overall speed position, the step-variable transmission portion 20 is shifted between the third speed AT gear position and the fourth speed AT gear position. (See FIG. 4.) Therefore, the AT gear position shifting map is formulated such that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the AT shift control portion 82 in response to a determination according to the overall speed-position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The AT shift control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine rotating speed ωe, so that the vehicle operator is less likely to uncomfortably recognize a shifting shock of the step-variable transmission portion 20.

The hybrid control portion 84 selectively establishes the motor drive mode or the hybrid drive mode, depending upon running state of the vehicle 10. For example, the hybrid control portion 84 selects the motor drive mode when the required vehicle drive power Pdem is lower than a predetermined threshold value, that is, within a predetermined motor-drive mode range, and selects the hybrid drive mode when the required vehicle drive power Pdem is equal to or higher than the threshold value, that is, within a predetermined hybrid-drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

There will be described a control operation performed for shifting of the transmission device 40 when the shifting of the transmission device 40 is accompanied by a shifting action of the step-variable transmission portion 20. When a shifting action is executed in the step-variable transmission portion 20 by the AT shift control portion 82 (particularly, in the inertia phase in process of the shifting action), the hybrid control portion 84 implements a basic shifting control in which the MG1 torque Tg and the MG2 torque Tm are controlled based on the engine torque Te and the transmitted torque Tcb transmitted through the step-variable transmission portion 20 (i.e., a transmitted torque of an initiative coupling device (i.e., one of the releasing and engaging coupling devices which is controlled to progressively execute the shifting action) such that a MG2 angular acceleration dωm/dt of the second motor/generator MG2 and an engine angular acceleration dωe/dt of the engine 14 coincide with respective predetermined target values. The control of the MG1 torque Tg and the MG2 torque Tm is equivalent to the control of the AT input torque Ti, namely, the AT input torque Ti can be controlled by controlling the MG1 torque Tg and the MG2 torque Tm, because a sum of the MG2 torque and the directly transmitted engine torque Td applied to the ring gear R0 owing to the reaction torque by the MG1 torque Tg that acts against the engine torque Te is equal to the input torque Ti of the step-variable transmission portion 20.

As the shifting control of the step-variable transmission portion 20, there are various patterns such as a power-on shift-up control (in which a shift-up action is executed by implementation of a power-on control), a power-off shift-up control (in which a shift-up action is executed by implementation of a power-off control), a power-on shift-down control (in which a shift-down action is executed by implementation of the power-on control) and a power-off shift-down control (in which a shift-down action is executed by implementation of the power-off control). For instance, the power-on shift up or shift-down control is implemented when the accelerator pedal operation amount θacc is increased or when the vehicle running speed V is raised while the accelerator pedal 69 is kept in an operated position, while the power-off shift-up or shift-down control is implemented when the accelerator pedal operation amount θacc is reduced or when the vehicle running speed V is lowered while the accelerator pedal 69 is kept in its non-operated or fully released position. If none of the two coupling devices releasing and engaging coupling devices) to be respectively brought into the released and engaged states is given the transmitted torque Tcb, the AT input speed ωi is naturally raised in the power-on shift-up or shift-down control, and is naturally lowered in the power-off shift-up or shift-down control. Accordingly, the shifting action is preferably initiated by increasing the transmitted torque Tcb of the engaging coupling device CB which is to be brought into the engaged state for the shifting action, in the power-on shift-up and power-off shift-down controls in which the AT input speed ωi is not naturally changed to a predetermined synchronized rotating speed ωisyca (=ω0×speed ratio γata to be established upon completion of the shifting action) if none of the two coupling devices to be respectively brought into the released and engaged states is given the transmitted torque Tcb. On the other hand, the shifting action is preferably initiated by reducing the transmitted torque Tcb of the releasing coupling device CB which has been placed in the engaged state before the shifting action and which is to be brought into the released state far the shifting action, in the power-off shift-up and power-on shift-down controls in which the AT input speed ωi is naturally changed to the predetermined synchronized rotating speed ωisyca even if none of the two coupling devices to be respectively brought into the released and engaged states is given the transmitted torque Tcb. Thus, the engaging coupling device CB to be brought into the engaged state in the power-on shift-up and power-off shift-down controls is the initiative coupling device the transmitted torque Tcb of which is controlled to progressively implement the shifting action, while the coupling device CB to be brought into the released state in the power-off shift-up and power-on shift-down controls is the initiative coupling device the transmitted torque Tcb of which is controlled to progressively implement the shifting action.

Described more specifically, the hybrid control portion 84 is configured to calculate the MG1 torque Tg and the MG2 torque Tm according to the following mathematical equation (1), and on the basis of the target values of the MG2 angular acceleration dωm/dt and the engine angular acceleration dωe/dt, the engine torque Te, and an AT-transmitted torque Tat. The hybrid control portion 84 is configured to apply the motor/generator control command signals Smg to the inverter 50, so as to obtain the calculated MG1 torque Tg and MG2 torque Tm. For example, the mathematical equation (1) is derived from kinetic equations and a relationship equation. Each of the kinetic equations is established for a corresponding one of the "g AXIS", "e AXIS" and "m AXIS" of the continuously variable transmission portion 18 (indicated in FIG. 3), and is represented by an inertia value, an angular acceleration value and a torque value on the corresponding axis. The relationship equation is formulated in view of the continuously variable transmission portion 18 which has two degrees of freedom, (namely, in view of a fact that if the rotating speeds taken along two of the above-indicated three axes are determined, the rotating speed taken along the other axis is determined). Accordingly, values a11, . . . , b11, . . . , c22 in 2×2 matrices in the mathematical equation (1) represent combinations of parameters such as the inertia values of the rotary members of the continuously variable transmission portion 18, and the gear ratio ρ0 of the differential mechanism 32.

Mathematical Equation (1)

$$\begin{bmatrix} a_{11} & a_{12} \\ a_{21} & a_{22} \end{bmatrix} \begin{bmatrix} \dot{\omega}_m \\ \dot{\omega}_e \end{bmatrix} = \begin{bmatrix} b_{11} & b_{12} \\ b_{21} & b_{22} \end{bmatrix} \begin{bmatrix} T_m \\ T_g \end{bmatrix} + \begin{bmatrix} c_{11} & c_{12} \\ c_{21} & c_{22} \end{bmatrix} \begin{bmatrix} T_e \\ T_{at} \end{bmatrix} \quad (1)$$

For example, the target values of the MG2 angular acceleration dωm/dt and the engine angular acceleration dωe/dt in the above equation (1) are predetermined, for example, depending upon (i) the presently established one of the shifting controls of the step-variable transmission portion 20, (iii) the specific shifting action of the step-variable transmission portion 20 to be performed between the AT gear positions, and (iii) the specific shifting action of the transmission device 40 to be performed between the overall speed positions, namely, depending upon (i) which one of the shifting controls (such as the above-described power-on shift-up control, power-off shift-up control, power-on shift-down control and power-off shift-down control) is to be implemented in the step-variable transmission portion 20, (ii) between which AT speed positions the shifting action is to be executed in the step-variable transmission portion 20, and (iii) between which overall speed positions the shifting action is to be performed in the transmission device 40. The engine torque Te in the mathematical equation (1) is a required engine torque Tedem at the engine rotating speed ωe at which the engine power Pe for obtaining the required vehicle drive power Pdem (i.e. required engine power Pedem) is obtained.

The AT-transmitted torque Tat in the mathematical equation (1) is a sum of the torque values of the intermediate power transmitting member 30 (the rotating speed of which is taken along the "m AXIS" in FIG. 3) which are obtained by conversion from the transmitted torques Tcb transmitted through the respective coupling devices CB during the relevant shifting action of the step-variable transmission portion 20, namely, the torque value of the intermediate power transmitting member 30 obtained by conversion from the torque transmitted through the step-variable transmission portion 20. The mathematical equation (1) is a model formula, i.e., an equation for a theoretical model of the shifting action of the step-variable transmission portion 20. In this respect, the transmitted torque Tcb of the initiative coupling device CB which is controlled to progressively implement the shifting action is used as the AT-transmitted torque Tat in the mathematical equation (1). The transmitted torque Tcb used as the AT-transmitted torque Tat in the mathematical equation (1) is a feed-forward value. The electronic control device 80 sets the transmitted torque Tcb of the initiative coupling device CB, on the basis of the target AT input torque Ti corresponding to the required engine power Pedem for establishing the required drive power Pdem (i.e., corresponding to the accelerator-pedal operation degree θacc and the vehicle running speed V), and according to an appropriate one of a plurality of predetermined relationships between the transmitted torque Tcb and the target AT input torque Ti, which are formulated to ensure a good balance between the shifting shock and the required shifting time of the step-variable transmission portion 20 and which correspond to respective different combinations of the presently established shifting control and the specific shifting action of the step-variable transmission portion 20 to be executed between the AT gear positions.

Figure 7:
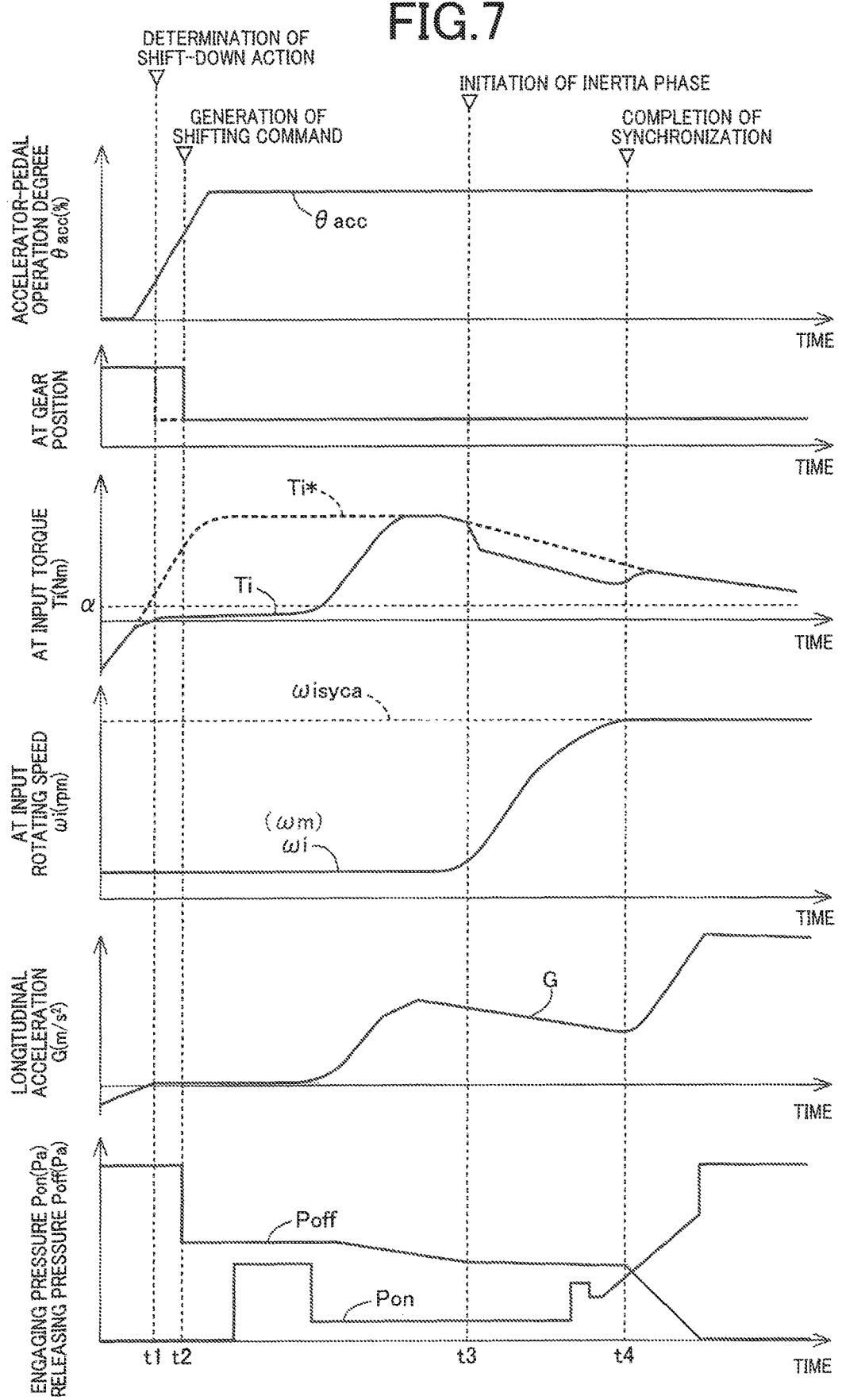
FIG. 7 is a time chart for explaining a power-on shift-down control that is implemented for executing a shift-down action in the step-variable transmission shown in FIG. 1.

FIG. 7 is a time chart for explaining a power-on shift-down control that is implemented for executing a shift-down action in the step-variable transmission portion 20. In FIG. 7, abscissa axes represent a time, while ordinate axes represent the accelerator-pedal operation degree θacc, the AT gear position of the step-variable transmission portion 20, the AT input torque (actual AT input torque Ti, target AT input torque Ti*), the longitudinal acceleration G of the vehicle 10, an engaging hydraulic pressure Pon and a releasing hydraulic pressure Poff in this order of description as viewed from top to bottom. A point t1 of time corresponds to a point of time at which it is determined that a shift-down action (shifting action) is to be executed in the step-variable transmission portion 20. A point t2 of time corresponds to a point of time at which a command requesting execution of the shift-down action (shifting-action requesting command) is outputted. A point t3 of time corresponds to a point of time at which an inertia phase is initiated. A point t4 of time corresponds to a point of time at which a rotational synchronization is completed. The above-described engaging hydraulic pressure Pon corresponds to a hydraulic pressure supplied to a hydraulic actuator of the engaging coupling device that is to be engaged upon completion of the shift-down action. The above-described releasing hydraulic pressure Poff corresponds to a hydraulic pressure supplied to a hydraulic actuator of the releasing coupling device that is to be released upon completion of the shift-down action. For example, in the shift-down action by which the step-variable transmission portion 20 is switched from the second speed AT gear position to the first speed AT gear position, a hydraulic pressure supplied to the brake B1 as the releasing coupling device corresponds to the releasing hydraulic pressure Poff while a hydraulic pressure supplied to the brake B2 as the engaging coupling device corresponds to the engaging hydraulic pressure Pon.

As the accelerator-pedal operation degree θacc is increased as a result of a depressing operation applied to the accelerator pedal 69, it is determined that the shift-down action is to be executed at the point t1 of time. Then, at the point t2 of time at which the shifting-action requesting command is generated or outputted, the shift-down action is initiated. In this instance, as described below, it is determined which one of the power-on shift-down control and the power-off shift-down control is to be selected to be implemented, depending on whether the target input torque Ti* at the point t2 of time is higher than a power-on determination threshold value α (hereinafter simply referred to as "determination threshold value α"). The power-on shift-down control is selected since the target input torque Ti* at the point t2 of time is higher than the determination threshold value α as shown in FIG. 7. Thus, at the point t2 of time and thereafter, the shift-down action is executed in conformity with a shifting pattern of the power-on shift-down control. It is noted that the determination threshold value α corresponds to a threshold value that is recited in the appended claims.

At the point t2 of time, the releasing hydraulic pressure Poff supplied to the releasing coupling device is reduced to a predetermined value, and then the releasing hydraulic pressure Poff is kept at the predetermined value for a predetermined length of time. When the predetermined length of time has elapsed, the releasing hydraulic pressure Poff is reduced gradually at a predetermined rate of reduction whereby a torque capacity of the step-variable transmission portion 20 is reduced. Meanwhile, the engaging hydraulic pressure Pon supplied to the engaging coupling device is temporarily increased to a predetermined value (for quick fill) shortly after the point t2 of time. After the temporary increase, the engaging hydraulic pressure Pon is reduced to a stand-by value, and is then kept at the stand-by value. Both of the releasing hydraulic pressure Poff and the engaging hydraulic pressure Pon are command values in accordance with the power-on shift-down control.

Before the accelerator pedal 69 is operated (depressed), the actual AT input torque Ti (represented by solid line in FIG. 7) is a negative value due to a driven torque transmitted back from the drive wheels 28. Then, the actual AT input torque Ti is increased as the accelerator pedal 69 is operated (depressed), and is converted to a positive value at a vicinity of the point t1 of time. Shortly before and after the change of the sign of the actual AT input torque Ti, a rate of the increase of the actual AT input torque Ti kept low for reducing noise generated by gear rattle, and then the actual AT input torque Ti is increased toward the target input torque Ti*. It is noted that the actual AT input torque Ti can be calculated, as needed, based on the engine torque Te, MG1 torque Tg and MG2 torque Tm.

At a point t3 of time (at which the inertia phase is initiated) and thereafter, the basic shifting control is implemented to control the MG1 torque Tg and the MG2 torque Tm, on the basis of the transmitted torque Tcb based on the releasing hydraulic pressure Poff of the releasing coupling device, such that the engine angular acceleration d$\omega$e/dt and the MG2 angular acceleration d$\omega$m/dt follow the respective target values. Thus, as shown in FIG. 7, the AT input rotating speed $\omega$i is increased at an appropriate rate after the initiation of the inertia phase, and the rate of increase of the AT input rotating speed $\omega$i is reduced shortly before a point t4 of time at which the rotational synchronization is completed, for thereby reducing the shifting shock.

By the way, when the vehicle running speed V is in the low speed range, the accuracy of detections made by rotating speed sensors is reduced, so that it is difficult to accurately control the AT input rotating speed $\omega$i as shown in FIG. 7. Therefore, when the vehicle running speed V is in the low speed range, the basic shifting control based on the above-described mathematical equation (1) is inhibited from being implemented.

Figure 8:
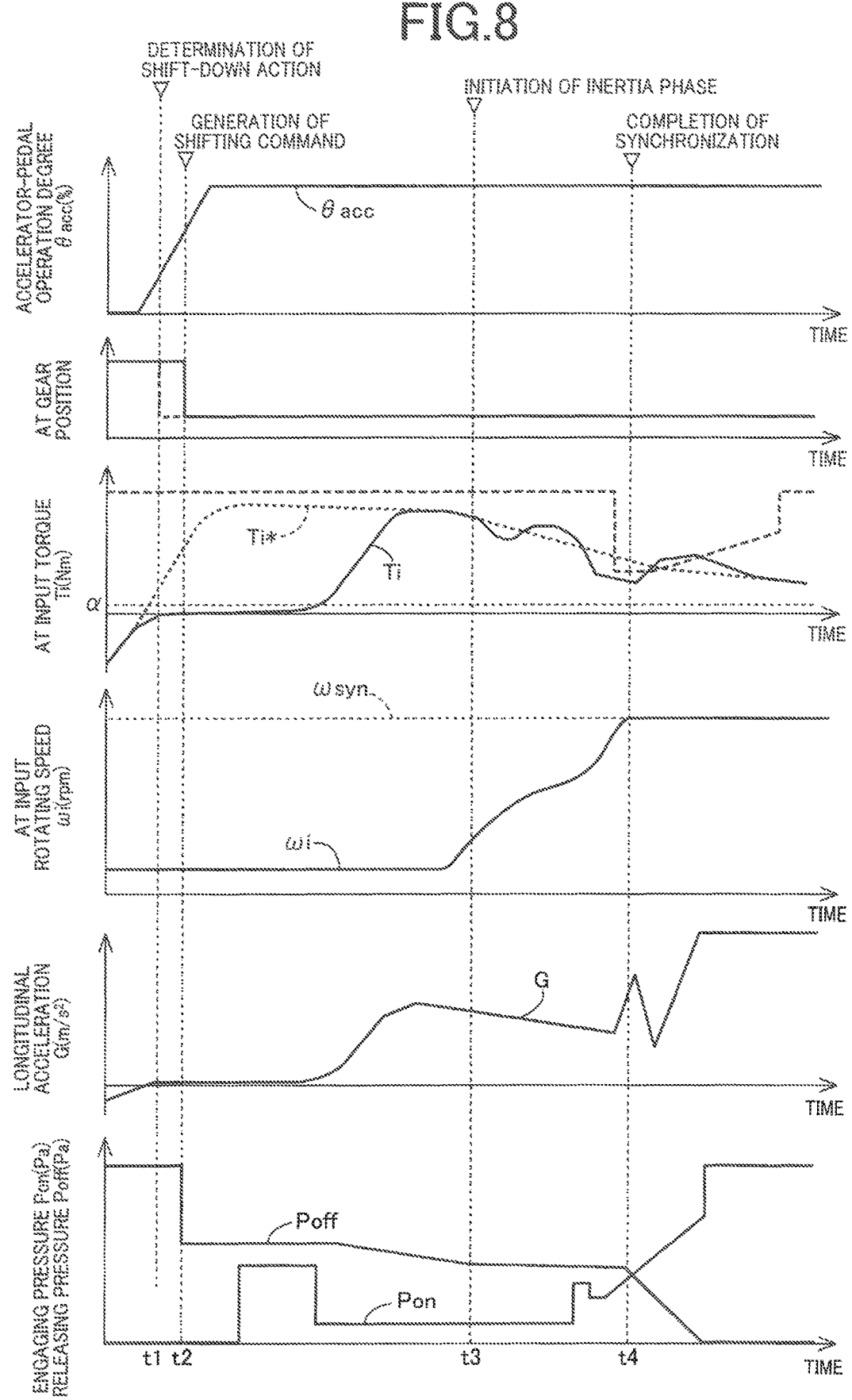
FIG. 8 is a time chart for explaining a conventional operation in which a power-on shift-down control is implemented for executing a shift-down action in the step-variable transmission when a vehicle running speed is in a low speed range.

FIG. 8 is a time chart for explaining a conventional operation in which a power-on shift-down control is implemented for executing a shift-down action in the step-variable transmission portion 20 when the vehicle running speed V is in a low speed range. In the low vehicle speed range, since the basic shifting control is inhibited, the rate of increase of the AT input rotating speed $\omega$i becomes unstable after the point t3 of time at which the inertia phase is initiated, as shown in FIG. 8. In connection with the AT input rotating speed $\omega$i, the actual AT input torque Ti is fluctuated unstably. Shortly before a point t4 of time at which the rotational synchronization is completed, although a torque-down command requesting reduction of the target AT input torque Ti* is outputted, the rate of increase of the AT input rotating speed $\omega$i is made higher than normal. Under this state, the AT input rotating speed $\omega$i reaches the synchronized rotating speed $\omega$isyca at the point t4 of time, and the engaging hydraulic pressure Pon of the engaging coupling pressure Pon is increased. In this instance, the longitudinal acceleration G is fluctuated whereby the shifting shock is caused.

On the other hand, in the present embodiment, when determining that a shift-down action is to be executed in the step-variable transmission portion 20 while the vehicle running speed V is in a low speed range, the electronic control device 80 selects one of the power-on shift-down control and the power-off shift-down control, depending on whether the actual input torque Ti is higher than the determination threshold value $\alpha$, and implements a selected one of the power-on shift-down control and the power-off shift-down control. Owing to this arrangement, even when the vehicle running speed V is in the low speed range, the shifting shock is reduced. Hereinafter, a shift-down action, which is executed in the step-variable transmission portion 20 when the vehicle running speed V is in a low speed range, will be mainly described.

The electronic control device 80 further includes a running-speed determining means or portion in the form of a running-speed determining portion 86, a torque determining means or portion in the form of a torque determining portion 88 and a torque limiting means or portion in the form of a torque limiting portion 90, for thereby reducing the shifting shock that is caused in process of a shift-down action of the step-variable transmission portion 20 in the low vehicle speed range. The running-speed determining portion 86, torque determining portion 88 and torque limiting portion 90 cooperate with the above-described hybrid control portion 84 to constitute a selecting/implementing control portion that is recited in the appended claims.

The running-speed determining portion 86 determines whether the vehicle running speed V at a point of time of initiation of a shift-down action (i.e., at a point of time of output of a command requesting a shift-down action) is equal to or higher than a predetermined value V1. This predetermined value V1 is a value that is determined by experimentation or determined by an appropriate design theory, in view of a degree of accuracy of detections made by rotating speed sensors, and is a threshold value (lower limit value) that is minimally required to assure a control accuracy when the basic shifting control is implemented. In other words, the predetermined value V1 is a threshold between a low speed range in which the implementation of the basic shifting control is inhibited and a non-low speed range in which the implementation of the basic shifting control is allowed.

When it is determined by the running-speed determining portion 86 that the vehicle running speed V1 is not lower than the predetermined value V1, the torque determining portion 88 determines which one of the power-on shift-down control and the power-off shift-down control is to be implemented, depending on the target input torque Ti* at the point of time of initiation of the shift-down action (i.e., at the point of time of output of the command requesting the shift-down action). Specifically, the torque determining portion 88 determines which one of the power-on shift-down control and the power-off shift-down control is to be implemented, depending on whether the target input torque Ti* is equal to or higher than the determination threshold value $\alpha$. For example, the torque determining portion 88 selects the power-on shift-down control when the target input torque Ti* is not lower than the determination threshold value $\alpha$, and selects the power-off shift-down control when the target input torque Ti* is lower than the determination threshold value $\alpha$. The determination threshold value $\alpha$ is a value that is determined by experimentation or determined by an appropriate design theory, for example, such that the releasing hydraulic pressure Poff of the releasing coupling device can be changed to enable the shift-down action to be progressed when the power-on shift-down control is selected (with the target input torque Ti* being not smaller than the determination threshold value α) to be implemented, and such that the longitudinal acceleration G would be changed by an amount exceeding a tolerable amount if the power-off shift-down control were selected (even with the target input torque Ti* being not smaller than the determination threshold value α) to be implemented.

When the power-on shift-down control is selected, the power-on shift-down control is implemented. Specifically, the hybrid control portion 84 controls the MG1 torque Tm and the MG2 torque Tm, on the basis of the engine torque Te and the AT-transmitted torque Tat, in accordance with the above-described mathematical equation (1), such that the MG2 angular acceleration dωm/dt and the engine angular acceleration dωe/dt become equal to respective target values (see FIG. 7). When the power-off shift-down control is selected, the power-off shift-down control is implemented as in below-described case where the vehicle running speed V is lower than the predetermined value V1. That is, the power-off shift-down control does not vary in contents depending on whether or not the vehicle running speed V is lower than the predetermined value V1, namely, the power-off shift-down control implemented in the case where the vehicle running speed V is not lower than the predetermined value V1 is basically not different from the power-off shift-down control implemented in the in below-described case where the vehicle running speed V is lower than the predetermined value V1, the description thereof is not provided herein.

Next, the case where the vehicle running speed V is lower than the predetermined value V1 (where the vehicle running speed V is in a low speed range) will be described. When it is determined by the running-speed determining portion 86 that the vehicle running speed V1 is lower than the predetermined value V1, the torque determining portion 88 determines which one of the power-on shift-down control and the power-off shift-down control is to be implemented, depending on the actual AT input torque Ti at the point of time of initiation of the shift-down action (i.e., at the point of time of output of the command requesting the shift-down action). Specifically, the torque determining portion 88 selects the power-on shift-down control when the actual input torque Ti is not lower than the determination threshold value α, and selects the power-off shift-down control when the actual input torque Ti is lower than the determination threshold value α.

There will be described a case where the vehicle running speed V is lower than the predetermined value V1 and the actual input torque Ti is lower than the determination threshold value α. When the actual input torque Ti is lower than the determination threshold value α, the power-off shift-down control is selected to be implemented. Specifically, the torque limiting portion 90 sets an upper limit value of the target AT input torque Ti* in process of the shift-down action, particularly, in a period from the point of time of initiation of the shift-down action to a point of time of termination of the inertia phase (i.e., a point of time of completion of the synchronization). After having set the upper limit value Tlim, the torque limiting portion 90 supplies, to the hybrid control portion 84, a command for liming the target AT input torque Ti* such that the target AT input torque Ti* does not exceed the upper limit value Tlim. Thus, when the target AT input torque Ti* is about to exceed the upper limit value Tlim, the target AT input torque Ti* is set to the upper limit value Tlim. Further, since the actual AT input torque Ti follows the target AT input torque Ti*, the torque limiting portion 90 practically limits the actual input torque Ti actually inputted to the step-variable transmission portion 20 such that the actual input torque Ti does not exceed the upper limit value Tlim, either.

The upper limit value Tlim is a value which is predetermined by experimentation or determined by an appropriate design theory, and which causes the rate of increase of the AT input rotating speed ωi shortly before completion of the synchronization, to be in a range that assures reduction of the shifting shock. The upper limit value Tlim may be changed depending on the accelerator-pedal operation degree θacc. Since a vehicle operator becomes less sensitive to the shifting shock with increase of an acceleration required by the vehicle operator, namely, with increase of the accelerator-pedal operation degree θacc, a higher priority is given to the responsiveness and accordingly the upper limit value Tlim is increased with increase of the accelerator-pedal operation degree θacc. Further, the upper limit value Tlim may be changed depending on the vehicle running speed V in addition to or in place of depending on the accelerator-pedal operation degree θacc. Since an increase of the vehicle running speed V leads to an increase of amount of change of the AT input rotating speed ωi during the inertia phase before and after the completion of the shift-down action, the upper limit value Tlim is increased with increase of the vehicle running speed V, for thereby restraining reduction of the responsiveness.

From the point of time of initiation of the shift-down action, the releasing hydraulic pressure Poff of the releasing coupling device is rapidly reduced whereby the torque capacity of the step-variable transmission portion 20 is controlled (reduced) to zero or substantially zero. With the torque capacity of the step-variable transmission portion 20 being reduced to zero or substantially zero, the AT input rotating speed ωi can be increased to the synchronized rotating speed ωisyca, although the AT input torque Ti is limited to the upper limit value Tlim. Further, the AT input rotating speed ωi is restrained from being fluctuated during the inertia phase, and accordingly the longitudinal acceleration G of the vehicle 10 is restrained from being fluctuated at the point of time of completion of the synchronization, whereby the shifting shock is reduced.

After the rotational synchronization has been completed, the torque limiting portion 90 gradually increases the upper limit value Tlim up to the target AT input torque Ti* that is calculated based on, for example, the accelerator-pedal operation degree θacc, whereby the torque limitation is terminated. Further, after the rotational synchronization has been completed, the engaging hydraulic pressure Pon of the engaging coupling device is increased whereby the shift-down action is completed. In this power-off shift-down control, the torque capacity of the step-variable transmission portion 20 is rapidly made zero or substantially zero from the point of time of initiation of the shift-down action. Thus, although the change of the longitudinal acceleration G is not caused shortly after initiation of operation of the accelerator pedal 69, the inertia phase is initiated early thereby reducing a length of time required to complete the shift-down action, so that a length of time required to maximize the longitudinal acceleration G, namely, to output a peak of the longitudinal acceleration G, can be made substantially the same as that in the power-on shift-down control.

On the other hand, in a case where the vehicle running speed V is lower than the predetermined value V1 and the actual input torque Ti is not lower than the determination threshold value α at a point of time at which it is determined that the shift-down action is to be executed, the power-on shift-down control is selected be implemented. Specifically, the power-on shift-down control is implemented in substantially the same manner as the control shown in FIG. 8, so that there is a risk that the shifting shock could be caused at the point of time of completion of the rotational synchronization. However, since the actual AT input torque Ti does not often exceed the determination threshold value α at the point of time of initiation of the shift-down action, the frequency of implementation of the power-on shift-down control is small. Further, when the actual AT input torque Ti is higher than the determination threshold value α at the point of time of initiation of the shift-down action, the actual AT input torque Ti is sufficiently high so that the longitudinal acceleration G is also sufficiently high. If the power-off shift-down control were implemented in this state in which the longitudinal acceleration G is sufficiently high, the longitudinal acceleration G would be largely reduced whereby a large shock due to the large change of the longitudinal acceleration G could be caused in placed of the shifting shock caused upon completion of the rotational synchronization, so that the vehicle operator would uncomfortably recognize the large shock due to the large change of the longitudinal acceleration G. Therefore, when the actual AT input torque Ti is not lower than the determination threshold value α, the implementation of the power-on shift-down control makes it possible to avoid the uncomfortable shock due to the abrupt reduction of the longitudinal acceleration G, although the implementation of the power-on shift-down control might cause the shifting shock.

Figure 9:
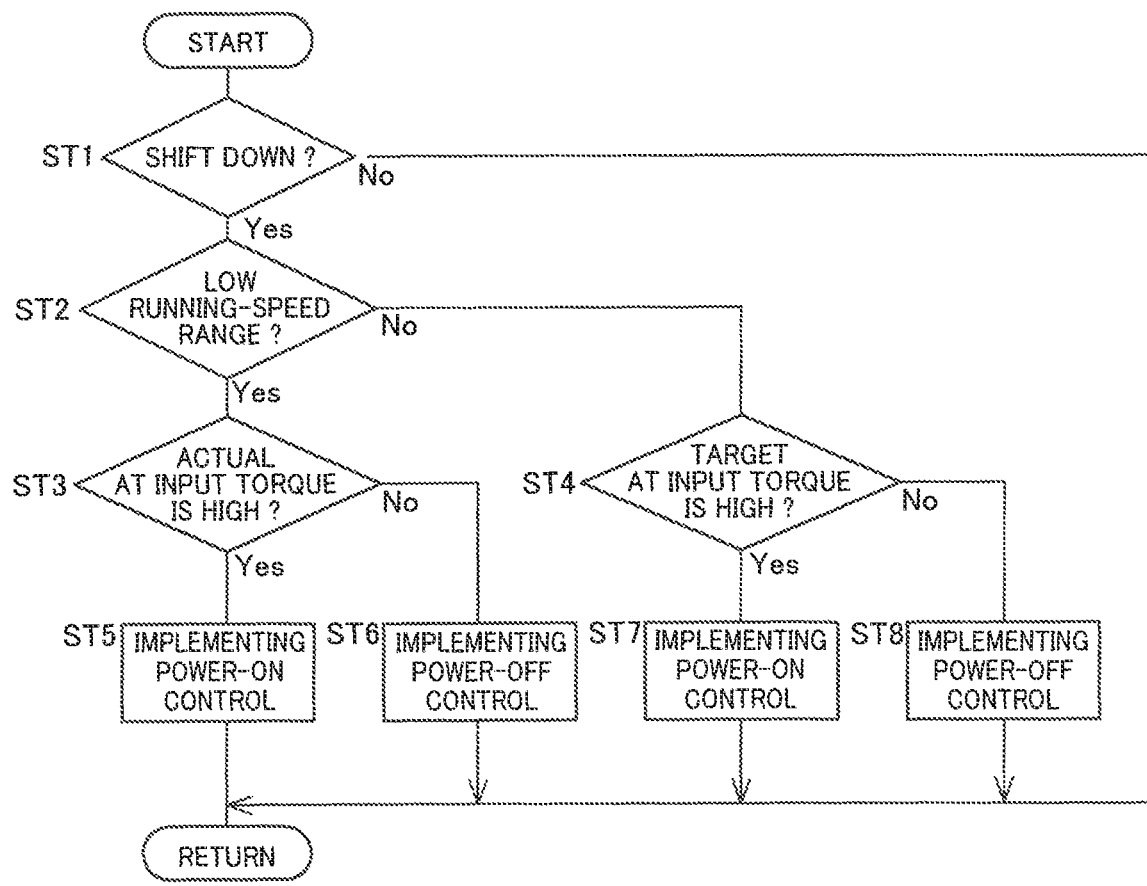
FIG. 9 is a flow chart illustrating an essential part of a main control routine executed by an electronic control device shown in FIG. 1, namely, a control routine that is executed, upon execution of a shift-down action of the step-variable transmission, for reducing a shifting shock even when the vehicle running speed is in a low speed range.

FIG. 9 is a flow chart illustrating an essential part of a main control routine executed by the electronic control device 80, namely, a control routine that is executed, upon execution of a shift-down action of the step-variable transmission portion 20, for reducing a shifting shock even when the vehicle running speed is in a low speed range. This control routine is executed in a repeated manner during running of the vehicle 10.

The control routine of FIG. 9 is initiated with step ST1 corresponding to function of the AT shift control portion 82, to determine whether the shift-down action is to be executed. When a negative determination is made at step ST1, one cycle of execution of this control routine is terminated. When an affirmative determination is made at step ST1, step ST2 corresponding to function of the running-speed determining portion 86 is implemented to determine whether the vehicle running speed V is equal to or lower than the predetermined value V1, namely, whether the vehicle running speed V is in a low speed range in which implementation of the basic shifting control is to be inhibited.

When a negative determination is made at step ST2, the control flow goes to step ST4 corresponding to the torque determining portion 88 in which it is determined whether the target AT input torque Ti* at the point of time of initiation of the shift-down action (i.e., at the point of time of output of the command requesting the shift-down action) is equal to or higher than the determination threshold value α. When an affirmative determination is made at step ST4, it is determined that the power-on shift-down control is to be implemented, and the control flow goes to step ST7 corresponding to functions of the AT shift control portion 82 and the hybrid control portion 84 in which the power-on shift-down control of the step-variable transmission portion 20 is implemented. When a negative determination is made at step ST4, it is determined that the power-off shift-down control is to be implemented, and the control flow goes to step ST8 corresponding to functions of the AT shift control portion 82 and the hybrid control portion 84 in which the power-off shift-down control of the step-variable transmission portion 20 is implemented.

When an affirmative determination is made at step ST2, the control flow goes to step ST3 corresponding to the torque determining portion 88 in which it is determined whether the actual AT input torque Ti at the point of time of initiation of the shift-down action (i.e., at the point of time of output of the command requesting the shift-down action) is equal to or higher than the determination threshold value α. When an affirmative determination is made at step ST3, it is determined that the power-on shift down control is to be implemented, and the control flow goes to step ST5 corresponding to functions of the AT shift control portion 82 and the hybrid control portion 84 in which the power-on shift-down control of the step-variable transmission portion 20 is implemented. When a negative determination is made at step ST3, it is determined that the power off shift-down control is to be implemented, and the control flow goes to step S16 corresponding to functions of the AT shift control portion 82 and the hybrid control portion 84 in which the power-off shift-down control of the step-variable transmission portion 20 is implemented.

Figure 10:
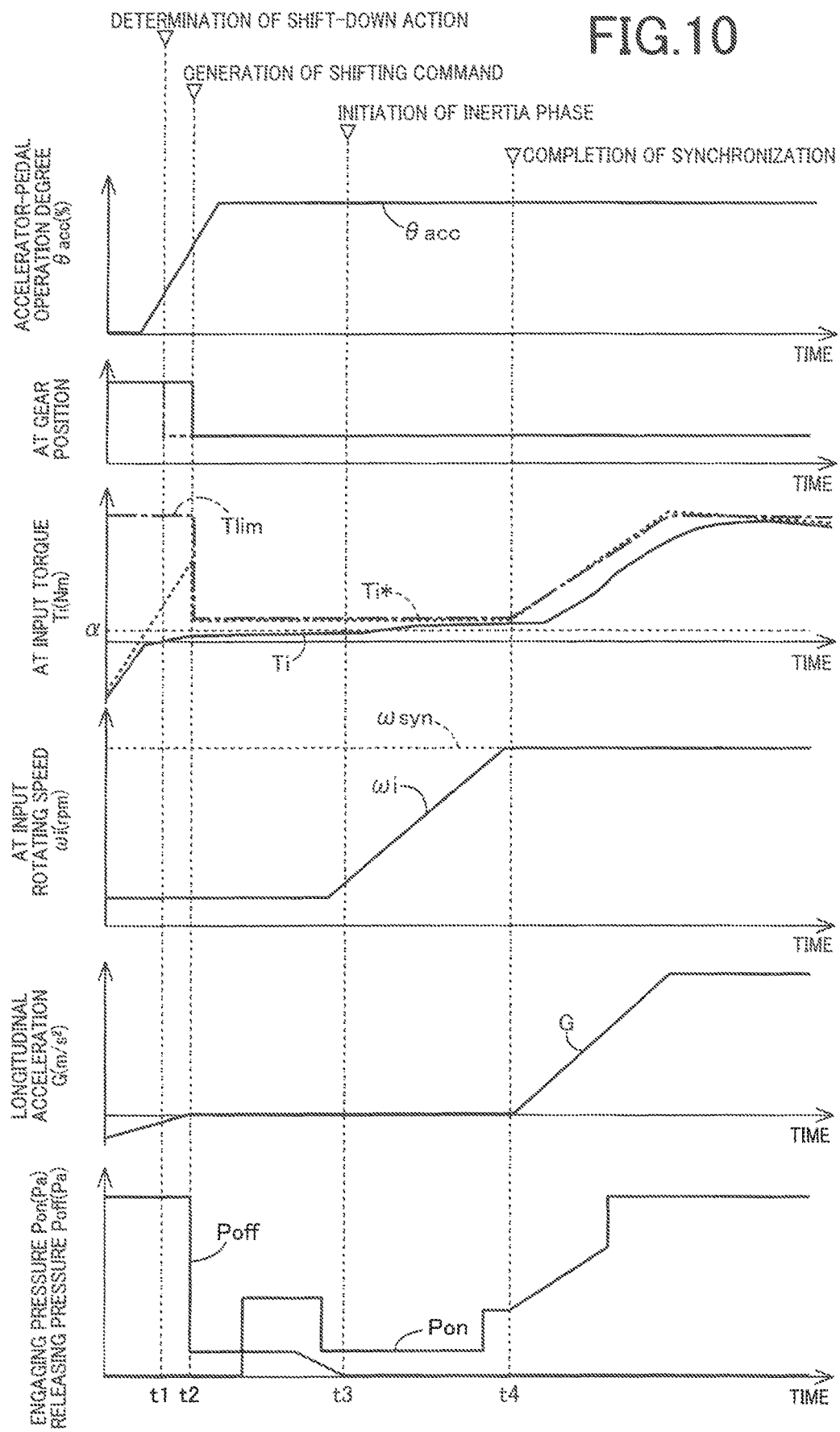
FIG. 10 is an example of a time chart where the control routine illustrated by the flow chart of FIG. 9 is executed upon execution of a shift-down action in the step-variable transmission, particularly, when the vehicle running speed is lower than a predetermined value and an actual input torque inputted to the step-variable transmission is lower than a power-on determination threshold value upon initiation of the shift-down action.

FIG. 10 is an example of a time chart where the control routine illustrated by the flow chart of FIG. 9 is executed upon execution of the shift-down action in the step-variable transmission portion 20, particularly, when the vehicle running speed V is lower than the predetermined value V1 and the actual AT input torque Ti is lower than the determination threshold value α at the point of time of initiation of the shift-down action (i.e., at the point of time of output of the command requesting the shift-down action). The example shown in FIG. 10 corresponds to a case where step ST6 shown in FIG. 9 is implemented.

Since the actual AT input torque Ti at a point t2 of time (at which the shift-down action is initiated, namely, the command requesting the shift-down action is outputted) is lower than the determination threshold value α, it is determined that the power-off shift-down control is to be implemented. Thus, the target AT input torque Ti* represented by broken line is limited to the upper limit value Tlim represented by one-dot chain line. In connection with the limitation on the target AT input torque Ti*, the actual AT input torque Ti also is practically limited to the upper limit value Tlim. Further, at the point t2 of time, the releasing hydraulic pressure Poff of the releasing coupling device is reduced in a single step, whereby the torque capacity of the step-variable transmission portion 20 is rapidly reduced to zero or substantially zero. Thus, the inertia phase is initiated at an early point of time, and the fluctuation of the AT input rotating speed all after the initiation of the inertia phase (at the point t3 of time and thereafter) is restrained whereby the shifting shock upon completion of the synchronization is restrained. Further, the fluctuation of the engine rotating speed ωe during the inertia phase is also restrained, although not being shown in FIG. 9. In this power-off shift-down control, the torque capacity of the step-variable transmission portion 20 is rapidly made zero or substantially zero at the point t2 time. Thus, although the change of the longitudinal acceleration G is not felt or recognized shortly after initiation of operation of the accelerator pedal 69, the inertia phase is initiated early thereby reducing a length of time required to complete the shift-down action, so that a length of time required to maximize the longitudinal acceleration G namely, to output a peak of the longitudinal acceleration G, can be made substantially the same as that in the power-on shift-down control.

When the vehicle running speed V is low, there is a risk that a shifting shock could be caused due to control accuracy reduction resulting from reduction of accuracy of detection made by a rotating speed sensor or the like. However, as described above, in the present embodiment, when the vehicle running speed V is low, one of the power-on control and the power-off control is selected based on the actual input torque Ti rather than the target input torque Ti*, and the selected one of the power-on control and the power-off control is implemented. With the selection being made based on the actual input torque Ti, a frequency of implementation of the power-off control in which a higher priority is given to reduction of the shifting shock is increased whereby the shifting shock is reduced. On the other hand, when the vehicle running speed V is high, one of the power-on control and the power-off control is selected based on the target input torque Ti* rather than the actual input torque Ti, whereby a high degree of responsiveness to an acceleration required by a vehicle operator can be assured.

In the present embodiment, when the vehicle running speed V is lower than the predetermined value V1 and the actual input torque Ti is lower than the determination threshold value α, the power-off control is selected to be implemented. By implementation of the power-off control, the torque capacity of the releasing coupling device is reduced to zero or substantially zero and the actual input torque Ti is limited to the upper limit value Tlim, so that the AT input rotating speed θi can be synchronized with the target value ωisyca after completion of the shift-down action while the AT input rotating speed ωi is restrained from being fluctuated and increased at a high rate. Thus, it is possible to restrain the shifting shock caused upon the rotational synchronization.

In the present embodiment, the upper limit value Tlim of the actual input torque Ti is changed depending on the accelerator-pedal operation degree θacc, so that the shift-down action can be executed appropriately depending on an acceleration required by the vehicle operator. Since the accelerator-pedal operation degree θacc is increased with increase of the acceleration required by the vehicle operator, for example, the shifting responsiveness can be increased owing to the arrangement in which the upper limit value Tlim is increased with increase of the accelerator-pedal operation degree θacc. Further, the upper limit value Tlim of the actual input torque Ti is changed depending on the vehicle running speed V in addition to or in place of depending on the accelerator-pedal operation degree θacc, so that the shift-down action can be executed appropriately depending on the vehicle running speed V in addition to or in place of depending on the accelerator-pedal operation degree θacc. Since the AT input rotating speed ωi of the step-variable transmission portion 20 is changed, during the shift-down action, by an amount that is increased with increase of the vehicle running speed V, for example, the shifting responsiveness can be restrained from being reduced, owing to the arrangement in which the upper limit Tlim is set to be increased with increase of the vehicle running speed V in addition to or in place of increase of the accelerator-pedal operation degree θacc.

While the preferred embodiment of this invention has been described in detail by reference to the drawings, it is to be understood that the invention may be otherwise embodied.

For example, in the above-described embodiment, the vehicle 10 is a hybrid vehicle in which the drive power source is constituted by the engine 14, the differential mechanism 32, the first motor/generator MG1 connected to one of the rotary elements of the differential mechanism 32 and the second motor/generator MG2 connected to another one of the rotary elements of the differential mechanism 32. However, the present invention is applicable also to a single-motor type hybrid vehicle in which the drive power source is constituted by an engine and a motor/generator that are arranged in a series. Moreover, the present invention is applicable also to an electric vehicle in which the drive power source is constituted by only an motor/generator.

Further in the above-described embodiment, the step-variable transmission portion 20 is an automatic transmission including the first planetary gear set 36, the second planetary gear set 38, the clutches C1, C2, the brakes B1, B2 and the one-way clutch F1 and capable of establishing four forward AT gear positions. However, the number of the gear positions, the number of the planetary gear sets, the number of the coupling devices CB and the coupling or engaging structure of each coupling device CB are not limited to the details of the above-described embodiment, but may be modified as needed.

Further, in the above-described embodiment, the determination as to which one of the power-on shift-down control and the power-off shift-down control is to be implemented, is made based on the actual input torque Ti or the target input torque Ti* at the point of time of initiation of the shift-down action (i.e., at the point of time of output of the command requesting the shift-down action). However, this determination may be made based on the actual input torque Ti or the target input torque Ti* at the point of time at which it is determined that the shift-down action is to be executed.

Further, in the above-described embodiment, in the power off shift-down control, the releasing hydraulic pressure Poff of the releasing coupling device is reduced in a single step. However, the reduction of the releasing hydraulic pressure Poff does not necessarily have to be made in a single step but may be made in a gradual manner (sweep down).

Further, in the above-described embodiment, the upper limit value Tlim of the target AT input torque Ti* is set to a value larger than zero. However, the upper limit value Tlim may be set to zero or substantially zero.

Further, in the above-described embodiment, the above-described predetermined value V1 of the vehicle running speed V is a threshold value that is minimally required to assure an accuracy of detections made by the rotating speed sensors and a control accuracy, which are required for implementation of the basic shifting control. However, the predetermined value V1 of the vehicle running speed V may be a threshold value, for example, which assures substantially the same shifting responsiveness even in case of implementation of the power-off shift-down control, as in case of implementation of the power-on shift-down control. That is, where there exists a threshold value of the vehicle running speed V, which assures the substantially the same shifting responsiveness even in case of implementation of the power-off shift-down control, as in case of implementation of the power-on shift-down control, and which assures also reduction of the shifting shock, the predetermined value V1 may be such a threshold value.

It is to be understood that the embodiments described above are given for illustrative purpose only, and that the present invention may be embodied with various modifications and improvements which may occur to those skilled in the art.

NOMENCLATURE OF ELEMENTS

10: vehicle
14: engine (drive power source)

20: step-variable transmission portion (transmission)
30: intermediate power-transmitting member (input shaft)
32: differential mechanism (drive power source)
80: electronic control device (control apparatus)
82: AT shift control portion (shift control portion)
84: hybrid control portion (selecting/implementing control portion)
86: running-speed determining portion (selecting/implementing control portion)
88: torque determining portion (selecting/implementing control portion)
90: torque limiting portion (selecting/implementing control portion)
MG1: first motor/generator (drive power source)
MG2: second motor/generator (drive power source)
RE1: first rotary element
RE2: second rotary element
RE3: third rotary element

What is claimed is:

1. A control apparatus for a vehicle that includes (i) a drive power source and (ii) a transmission that constitutes a part of a power transmitting path between the drive power source and drive wheels of the vehicle, the transmission including a plurality of coupling devices,
said control apparatus comprising:
a shift control portion configured to cause a shifting action to be executed in the transmission, by engaging an engaging coupling device as one of the plurality of coupling devices which is to be engaged during the shifting action, and releasing a releasing coupling device as another one of the plurality of coupling devices which is to be released during the shifting action; and
a selecting/implementing control portion configured, for execution of a shift-down action as the shifting action, to select one of a power-on control and a power-off control, and to implement a selected one of the power-on control and the power-off control, wherein,
when a running speed of the vehicle is not lower than a predetermined value, said selecting/implementing control portion selects one of the power-on control and the power-off control, based on comparison between a target input torque that is to be inputted to the transmission and a threshold value, and
when the running speed of the vehicle is lower than the predetermined value, said selecting/implementing control portion selects one of the power-on control and the power-off control, based on comparison between an actual input torque that is actually inputted to the transmission and the threshold value.

2. The control apparatus according to claim 1, wherein
when the running speed of the vehicle is lower than the predetermined value and the actual input torque is lower than the threshold value, said selecting/implementing control portion selects the power-off control, and implements the power-off control in which, from initiation of the shift-down action, a torque capacity of the releasing coupling device is reduced to zero or substantially zero and the actual input torque is limited to an upper limit value.

3. The control apparatus according to claim 2, wherein
the upper limit value of the actual input torque is changed depending on an operation degree of an acceleration operation member of the vehicle.

4. The control apparatus according to claim 2, wherein
the upper limit value of the actual input torque is changed depending on the running speed of the vehicle.

5. The control apparatus according claim 1, wherein
the drive power source of the vehicle includes:
an engine;
a differential mechanism having a first rotary element to which the engine is connected in a power transmittable manner, a second rotary element to which a first motor/generator is connected in a power transmittable manner, and a third rotary element to which an input shaft of the transmission is connected; and
a second motor/generator connected to the third rotary element in a power transmittable manner.

6. The control apparatus according to claim 2, wherein
when the running speed of the vehicle is lower than the predetermined value and the actual input torque is not lower than the threshold value, said selecting/implementing control portion selects the power-on control, and implements the power-on control in which the actual input torque is controlled based on the target input torque without the actual input torque being limited to the upper limit value that is changed depending on an operation degree of an acceleration operation member of the vehicle and/or the running speed of the vehicle.

7. The control apparatus according to claim 6, wherein
when the running speed of the vehicle is not lower than the predetermined value and the target input torque is lower than the threshold value, said selecting/implementing control portion selects the power-off control, and implements the power-off control, and
when the running speed of the vehicle is not lower than the predetermined value and the target input torque is not lower than the threshold value, said selecting/implementing control portion selects the power-on control, and implements the power-on control.

8. A control apparatus for a vehicle that includes (i) a drive power source and (ii) a transmission that constitutes a part of a power transmitting path between the drive power source and drive wheels of the vehicle, the transmission including a plurality of coupling devices,
said control apparatus comprising a controller configured to:
cause a shifting action to be executed in the transmission, by engaging an engaging coupling device as one of the plurality of coupling devices which is to be engaged during the shifting action, and releasing a releasing coupling device as another one of the plurality of coupling devices which is to be released during the shifting action; and
select, for execution of a shift-down action as the shifting action, one of a power-on control and a power-off control, and to implement a selected one of the power-on control and the power-off control, wherein,
when a running speed of the vehicle is not lower than a predetermined value, the controller is configured to select one of the power-on control and the power-off control, based on comparison between a target input torque that is to be inputted to the transmission and a threshold value, and
when the running speed of the vehicle is lower than the predetermined value, the controller is configured to select one of the power-on control and the power-off control, based on comparison between an actual input torque that is actually inputted to the transmission and the threshold value.

9. The control apparatus according to claim 8, wherein
when the running speed of the vehicle is lower than the predetermined value and the actual input torque is lower than the threshold value, the controller is configured to select the power-off control, and implement the power-off control in which, from initiation of the shift-down action, a torque capacity of the releasing coupling device is reduced to zero or substantially zero and the actual input torque is limited to an upper limit value.

10. The control apparatus according to claim 9, wherein the upper limit value of the actual input torque is changed depending on an operation degree of an acceleration operation member of the vehicle.

11. The control apparatus according to claim 9, wherein the upper limit value of the actual input torque is changed depending on the running speed of the vehicle.

12. The control apparatus according claim 8, wherein the drive power source of the vehicle includes:
an engine;
a differential mechanism having a first rotary element to which the engine is connected in a power transmittable manner, a second rotary element to which a first motor/generator is connected in a power transmittable manner, and a third rotary element to which an input shaft of the transmission is connected; and
a second motor/generator connected to the third rotary element in a power transmittable manner.

13. The control apparatus according to claim 9, wherein when the running speed of the vehicle is lower than the predetermined value and the actual input torque is not lower than the threshold value, the controller is configured to select the power-on control, and implement the power-on control in which the actual input torque is controlled based on the target input torque without the actual input torque being limited to the upper limit value that is changed depending on an operation degree of an acceleration operation member of the vehicle and/or the running speed of the vehicle.

14. The control apparatus according to claim 13, wherein when the running speed of the vehicle is not lower than the predetermined value and the target input torque is lower than the threshold value, the controller is configured to select the power-off control, and implement the power-off control, and
when the running speed of the vehicle is not lower than the predetermined value and the target input torque is not lower than the threshold value, the controller is configured to select the power-on control, and implement the power-on control.

* * * * *